(12) United States Patent
Goodsitt et al.

(10) Patent No.: US 10,776,004 B1
(45) Date of Patent: Sep. 15, 2020

(54) METHODS AND DEVICES FOR PROVIDING CANDIDATE INPUTS

(71) Applicant: Capital One Services, LLC, McLean, VA (US)

(72) Inventors: Jeremy Goodsitt, Champaign, IL (US); Vincent Pham, Champaign, IL (US); Anh Truong, Champaign, IL (US); Mark Watson, Urbana, IL (US); Austin Walters, Savoy, IL (US)

(73) Assignee: Capital One Services, LLC, McLean, VA (US)

(*) Notice: Subject to any disclaimer, the term of this patent is extended or adjusted under 35 U.S.C. 154(b) by 0 days.

(21) Appl. No.: 16/405,460

(22) Filed: May 7, 2019

(51) Int. Cl.
 *G06F 17/27* (2006.01)
 *G06N 7/02* (2006.01)
 *G06F 3/048* (2013.01)
 *G06F 3/01* (2006.01)
 *G06F 3/0488* (2013.01)
 *G06F 3/0482* (2013.01)

(52) U.S. Cl.
 CPC ........ *G06F 3/04886* (2013.01); *G06F 3/0482* (2013.01); *G06F 3/04883* (2013.01)

(58) Field of Classification Search
 CPC .... G06F 3/0237; G06F 17/276; G06F 3/0233; G06F 3/04895; G06F 3/016
 See application file for complete search history.

(56) References Cited

U.S. PATENT DOCUMENTS

| | | | | |
|---|---|---|---|---|
| 9,176,668 | B2* | 11/2015 | Eleftheriou | G06F 3/04842 |
| 2009/0174667 | A1* | 7/2009 | Kocienda | G06F 3/0237 |
| | | | | 345/169 |
| 2011/0061017 | A1* | 3/2011 | Ullrich | G06F 3/016 |
| | | | | 715/780 |
| 2013/0246329 | A1* | 9/2013 | Pasquero | G06F 17/276 |
| | | | | 706/52 |
| 2014/0108992 | A1* | 4/2014 | Bi | G06F 17/276 |
| | | | | 715/773 |
| 2014/0244243 | A1 | 8/2014 | Kim et al. | |
| 2015/0051901 | A1* | 2/2015 | Stonehouse | G06F 17/276 |
| | | | | 704/9 |
| 2015/0309573 | A1* | 10/2015 | Brombach | B60K 37/02 |
| | | | | 715/702 |
| 2016/0253299 | A1* | 9/2016 | Mese | G06F 17/24 |
| | | | | 715/271 |
| 2017/0308290 | A1* | 10/2017 | Patel | G06F 3/04886 |
| 2018/0039616 | A1* | 2/2018 | Shalit | G06F 3/04886 |
| 2018/0089166 | A1 | 3/2018 | Meyer et al. | |

* cited by examiner

*Primary Examiner* — Tan H Tran
(74) *Attorney, Agent, or Firm* — Pillsbury Winthrop Shaw Pittman LLP

(57) ABSTRACT

A method for providing a plurality of candidate inputs on a user device is provided. The method may include displaying a virtual keyboard in a first area of a display, receiving a text input via the keyboard, displaying the text input, and receiving a user request to enter a sentence-generating mode. The sentence-generating mode may inhibit display of the keyboard and display the candidate inputs in a second area of the display, the second area comprising the first area. The method may further include receiving a selection of one of the candidate inputs and displaying the received selection.

16 Claims, 8 Drawing Sheets

US 10,776,004 B1

METHODS AND DEVICES FOR PROVIDING CANDIDATE INPUTS

TECHNICAL FIELD

The disclosed embodiments generally relate to the field of communication devices and systems and, more particularly, to methods, devices and systems for providing candidate inputs on a user device.

BACKGROUND

Mobile devices, such as smart phone devices, usually have virtual or physical keyboards in a small size. Due to the small keyboard, it takes more time for a user to enter text, and the user-entered text is prone to errors. To facilitate input of text by users, current mobile devices often provide functionalities of text prediction. The text prediction function allows a mobile device to present predicted text for a user to select and enter, thereby saving the user's time to manually type out the same word.

There are several disadvantages with current text prediction in mobile devices. First, it provides a limited number of predicted options for a user to select from. For example, usually predicted options are displayed in a row below the area in which the text is being inputted. Frequently the displayed predictions do not include the user's intended input, and the user still must manually type the desired input text. Second, current text prediction is based on the user's input in the past and does not allow a user to directly indicate how the text prediction should be performed. For example, the current text prediction does not include a user interface for a user to request text prediction for a certain category of inputs, such as punctuations, or certain verbs or nouns. It is therefore desirable to provide text prediction functions that include more text prediction options for user selection and that allow the user to request a particular type of predictions.

SUMMARY

Disclosed embodiments include a user device. The user device may include a display, at least one processor, and at least one memory. The memory may store instructions that, when executed by the processor, cause the processor to perform operations including: displaying a virtual keyboard in a first area of the display; receiving a text input via the keyboard; displaying the text input; receiving a user request to enter a sentence-generating mode, the sentence-generating mode: inhibiting display of the keyboard; and displaying a plurality of candidate inputs in a second area of the display, the second area comprising the first area; receiving a selection of one of the candidate inputs; and displaying the received selection.

Disclosed embodiments further include a method for providing a plurality of candidate inputs on a user device. The method may include: displaying a virtual keyboard in a first area of a display; receiving a text input via the keyboard; displaying the text input; receiving a user request to enter a sentence-generating mode, the sentence-generating mode: inhibiting display of the keyboard; and displaying the candidate inputs in a second area of the display, the second area comprising the first area; receiving a selection of one of the candidate inputs; and displaying the received selection.

Disclosed embodiments further include a non-transitory computer-readable medium that stores a set of instructions that is executable by at least one processor of a user device to cause the user device to perform a method for providing a plurality of candidate inputs. The method may include: displaying a virtual keyboard in a first area of a display; receiving a text input via the keyboard; displaying the text input; receiving a user request to enter a sentence-generating mode, the sentence-generating mode: inhibiting display of the keyboard; and displaying the candidate inputs in a second area of the display, the second area comprising the first area; receiving a selection of one of the candidate inputs; and displaying the received selection.

Additional objects and advantages of the disclosed embodiments will be set forth in part in the description which follows, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed. For example, the methods relating to the disclosed embodiments may be implemented in system environments outside of the exemplary system environments disclosed herein.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
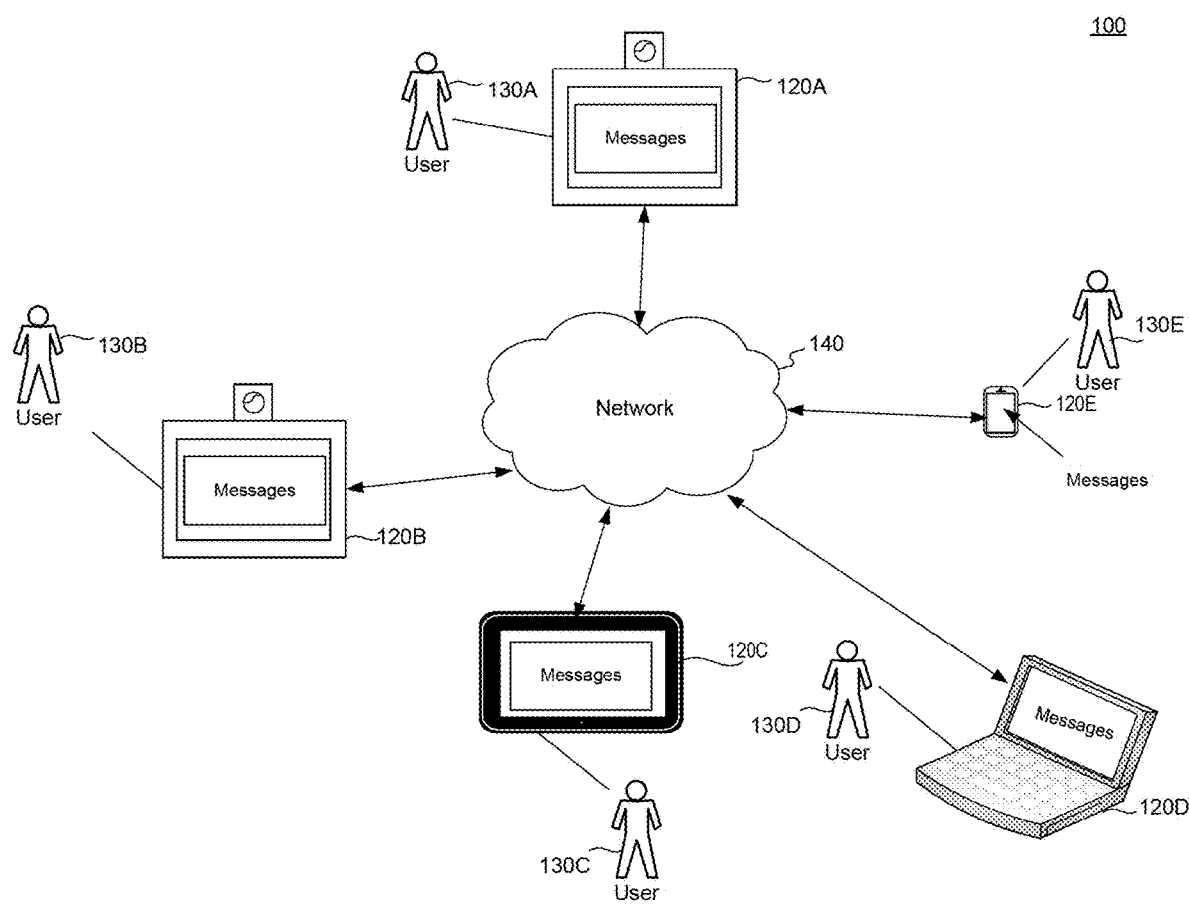
FIG. 1 is a diagram of an exemplary communications system in which various implementations described herein may be practiced.

Reference will now be made in detail to the disclosed embodiments, examples of which are illustrated in the accompanying drawings. Wherever convenient, the same reference numbers will be used throughout the drawings to refer to the same or like parts.

A user device, such as a mobile phone or a tablet, may provide input prediction functionalities to facilitate user input of text, in which one or more candidate inputs may be displayed as suggestions based on a user's current input. It may be desired that a number of candidate inputs be provided such that the likelihood of the candidate inputs having the user-intended input is higher. Further, it may be desired that a particular type of candidate inputs be displayed according to a user's indication that such candidate inputs are intended by the user as the next input.

Example embodiments of the present disclosure provide methods, devices and systems for providing candidate inputs. Consistent with disclosed embodiments, a user device may enter a sentence-generating mode in response to a user request. The sentence-generating mode may inhibit display of a virtual keyboard and display a plurality of candidate inputs in the area where the virtual keyboard was displayed. The user device may also display a plurality of synonyms or conjugations of a candidate input in response to detecting a user gesture performed on the candidate input.

The embodiments herein include computer-implemented methods, tangible non-transitory computer-readable mediums, and systems. The computer-implemented methods can be executed, for example, by at least one processor that receives instructions from a non-transitory computer-readable storage medium. Similarly, systems and devices consistent with the present disclosure can include at least one processor and memory, and the memory can be a non-transitory computer-readable storage medium. As used herein, a non-transitory computer-readable storage medium refers to any type of physical memory on which information or data readable by at least one processor can be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," can additionally refer to multiple structures, such a plurality of memories or computer-readable storage mediums. As referred to herein, a "memory" can comprise any type of computer-readable storage medium unless otherwise specified. A computer-readable storage medium can store instructions for execution by at least one processor, including instructions for causing the processor to perform steps or stages consistent with an embodiment herein. Additionally, one or more computer-readable storage mediums can be utilized in implementing a computer-implemented method. The term "computer-readable storage medium" should be understood to include tangible items and exclude carrier waves and transient signals.

FIG. 1 is a diagram of an exemplary communications system 100 in which various implementations described herein may be practiced. The components and arrangement shown in FIG. 1 are not intended to be limiting to the disclosed embodiment as the components used to implement the processes and features disclosed here may vary.

As shown in FIG. 1, communications system 100 includes a plurality of user devices 120A-120E associated with a plurality of users 130A-130E respectively. In some embodiments, communications system 100 may be, for example, a communication platform based on a chat application, a text message application, an EMAIL application, or a social network application that allows users (e.g., 130A-130E) to exchange electronic messages, documents, audio or video content, gaming, and otherwise interact with one another in real-time using associated user devices (e.g., 120A-120E).

As shown in FIG. 1, communications system 100 includes one or more user devices 120A-120E (collectively referred to as user devices 120) and a network 140. Network 140 facilitates communications and sharing of communication content between the user devices 120. Network 140 may be any type of networks that provides communications, exchanges information, and/or facilitates the exchange of information between user devices 120. For example, network 140 may be the Internet, a Local Area Network, a cellular network, a public switched telephone network ("PSTN"), or other suitable connection(s) that enables communications system 100 to send and receive information between the components of communications system 100. A network may support a variety of electronic messaging formats, and may further support a variety of services and applications for user devices 120.

Users 130A-130E communicate with one another using various types of user devices 120A-120E via network 140. As an example, user devices 120A, 120B, and 120D include a display such as a television, tablet, computer monitor, video conferencing console, or laptop computer screen. User devices 120A, 120B, and 120D may also include video/audio input devices such as a video camera, web camera, or the like. As another example, user devices 120C and 120E include mobile devices such as a tablet or a smartphone having display and video/audio capture capabilities. User devices 120A-120E may also include one or more software applications that facilitate the user devices to engage in communications, such as IM, text messages, EMAIL, VoIP, video conferences, with one another in a group communication environment where each user may view content posted by other users and may post content that can be accessed by other users in a communication group. The messages exchanged among user 130 via network 140 may contain text, audio, video, data, or any other multimedia content.

In some embodiments, user devices 120 may predict text likely to be entered by users 130 and provide candidate inputs for users 130 to select when typing a message. For example, user device 120E may display a plurality of candidate inputs for selection by user 130E when user 130E composes a message. The candidate inputs may be provided based on the current text input entered by user 130E and historic text input activities on user device 120E.

Figure 2:
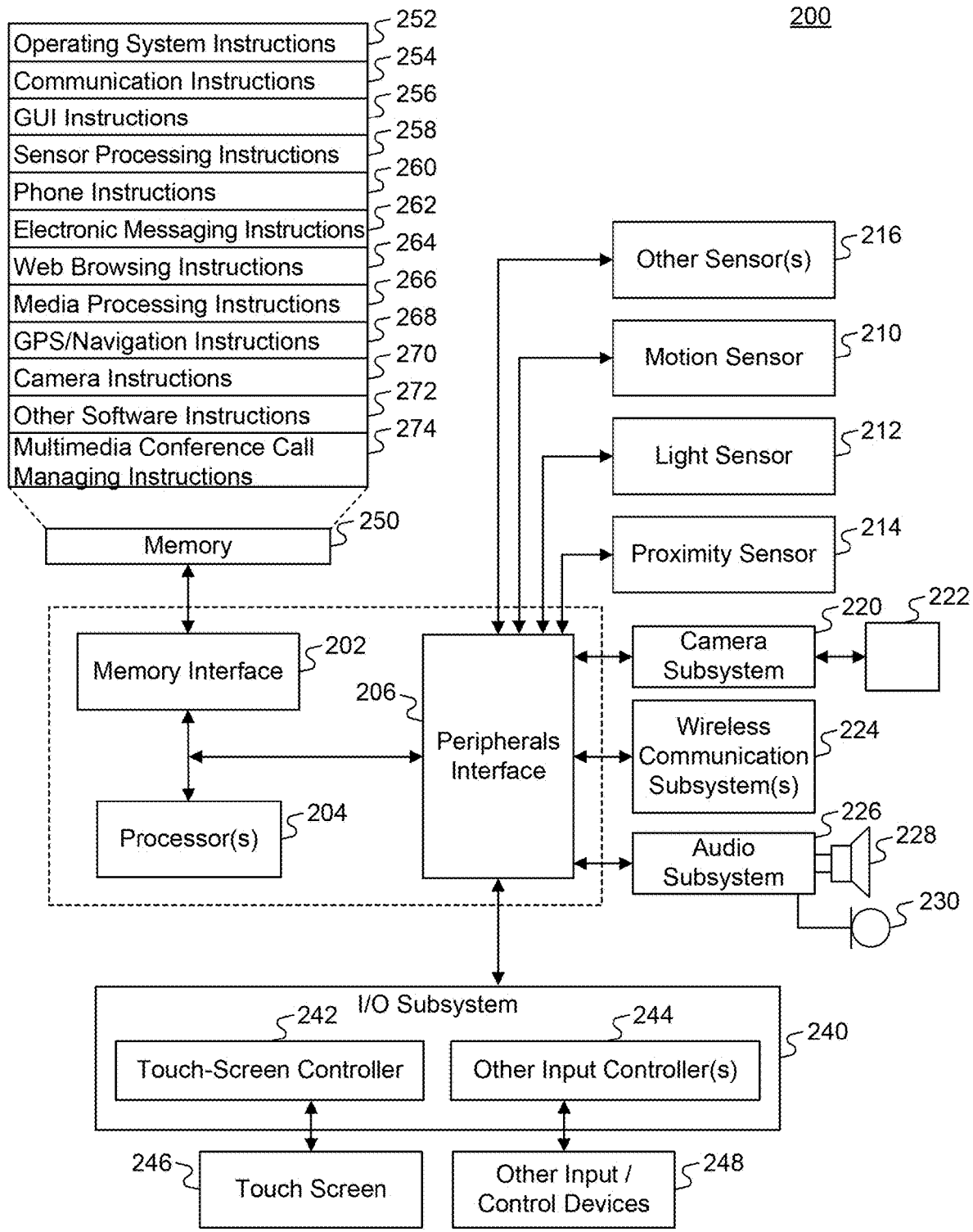
FIG. 2 is a block diagram of an exemplary user device for implementing embodiments consistent with the present disclosure.

FIG. 2 is a block diagram of an exemplary user device 200 for implementing embodiments consistent with the present disclosure. User device 200 can be used to implement computer programs, applications, methods, processes, or other software to perform embodiments described in the present disclosure. User device 200 includes a memory interface 202, one or more processors 204 such as data processors, image processors and/or central processing units, and a peripherals interface 206. Memory interface 202, processors 204, and/or peripherals interface 206 can be separate components or can be integrated in one or more integrated circuits. The various components in user device 200 can be coupled by one or more communication buses or signal lines.

Sensors, devices, and subsystems can be coupled to the peripherals interface 206 to facilitate multiple functionalities. For example, a motion sensor 210, a light sensor 212, and a proximity sensor 214 can be coupled to the peripherals interface 206 to facilitate orientation, lighting, and proximity functions. Other sensors 216 can also be connected to the peripherals interface 206, such as a positioning system (e.g., GPS receiver), a temperature sensor, a biometric sensor, or other sensing device, to facilitate related functionalities. A GPS receiver can be integrated with, or connected to, user device 200. For example, a GPS receiver can be built into mobile telephones, such as smartphone devices. GPS software allows mobile telephones to use an internal or external GPS receiver (e.g., connecting via a serial port or Bluetooth). A camera subsystem 220 and an optical sensor 222, e.g., a charged coupled device ("CCD") or a complementary metal-oxide semiconductor ("CMOS") optical sensor, may be utilized to facilitate camera functions, such as recording photographs and video clips.

In some embodiments, processors 204 may be configured to track a gaze of the user's eyes via camera subsystem 220. For example, camera subsystem 220 may capture an eye movement by sensing, via optical sensor 222, the infrared light reflected from an eye. Processors 204 may be configured to determine a particular text displayed on touch screen 246 that a user is looking at, based on the direction of the user's gaze. Processors 204 may be further configured to determine a duration of the user's gaze, based on the output of the eye tracking sensors.

In some embodiments, other sensors 216 may include one or more eye tracking sensors configured to track a viewing direction of the user by tracking and/or monitoring the eyes of the user to determine the user's gaze direction. The eye tracking sensors may also be configured to provide an output indicative of the viewing direction of the user by tracking a gaze of the user's eyes. Processors 204 may be configured to determine a particular text displayed on touch screen 246 a user is looking at based on the direction of the user's gaze. Processors 204 may be further configured to determine a duration of the user's gaze based on the output of the eye tracking sensors.

Communication functions may be facilitated through one or more wireless/wired communication subsystems 224, which may include an Ethernet port, radio frequency receivers and transmitters, and/or optical (e.g., infrared) receivers and transmitters. The specific design and implementation of wireless/wired communication subsystem 224 depends on the communication network(s) over which user device 200 is intended to operate. For example, in some embodiments, user device 200 includes wireless/wired communication subsystems 224 designed to operate over a GSM network, a GPRS network, an EDGE network, a Wi-Fi or WiMax network, and a Bluetooth® network.

An audio subsystem 226 may be coupled to a speaker 228 and a microphone 230 to facilitate voice-enabled functions, such as voice recognition, voice replication, digital recording, and telephony functions.

I/O subsystem 240 includes a touch screen controller 242 and/or other input controller(s) 244. Touch screen controller 242 is coupled to a touch screen 246. Touch screen 246 and touch screen controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 246. While touch screen 246 is shown in FIG. 2, I/O subsystem 240 may include a display screen (e.g., CRT or LCD) in place of touch screen 246.

Other input controller(s) 244 is coupled to other input/control devices 248, such as one or more buttons, rocker switches, thumb-wheel, infrared port, USB port, and/or a pointer device such as a stylus. Touch screen 246 can, for example, also be used to implement virtual or soft buttons and/or a keyboard.

Memory interface 202 is coupled to memory 250. Memory 250 includes high-speed random access memory and/or non-volatile memory, such as one or more magnetic disk storage devices, one or more optical storage devices, and/or flash memory (e.g., NAND, NOR). Memory 250 stores an operating system 252, such as DRAWIN, RTXC, LINUX, iOS, UNIX, OS X, WINDOWS, or an embedded operating system such as VXWorkS. The operating system 252 can include instructions for handling basic system services and for performing hardware dependent tasks. In some implementations, operating system 252 can be a kernel (e.g., UNIX kernel).

Memory 250 may also store communication instructions 254 to facilitate communicating with one or more additional devices, one or more computers and/or one or more servers. Memory 250 can include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GPS/navigation instructions 268 to facilitate GPS and navigation-related processes and instructions; camera instructions 270 to facilitate camera-related processes and functions; and/or other software instructions 272 to facilitate other processes and functions. Memory 250 may also include multimedia conference call managing instructions 274 to facilitate conference call related processes and instructions. Memory 250 may also include recipient vocabulary profiles.

In the presently described embodiment, the instructions cause processor 204 to perform one or more functions of the disclosed methods. For example, the instructions may cause the processor 204 to display a virtual keyboard in a first area of the display, receive text input via the keyboard, display the text input, receive a user request to enter a sentence-generating mode, the sentence-generating mode inhibiting display of the keyboard and displaying a plurality of candidate inputs in a second area of the display, the second area comprising the first area, receive a selection of one of the candidate inputs, and display the received selection.

Each of the above identified instructions and software applications may correspond to a set of instructions for performing functions described above. These instructions need not be implemented as separate software programs, procedures, or modules. The memory 250 may include additional instructions or fewer instructions. Furthermore, various functions of the user device 200 may be implemented in hardware and/or in software, including in one or more signal processing and/or application-specific integrated circuits (ASICs).

Figure 3:
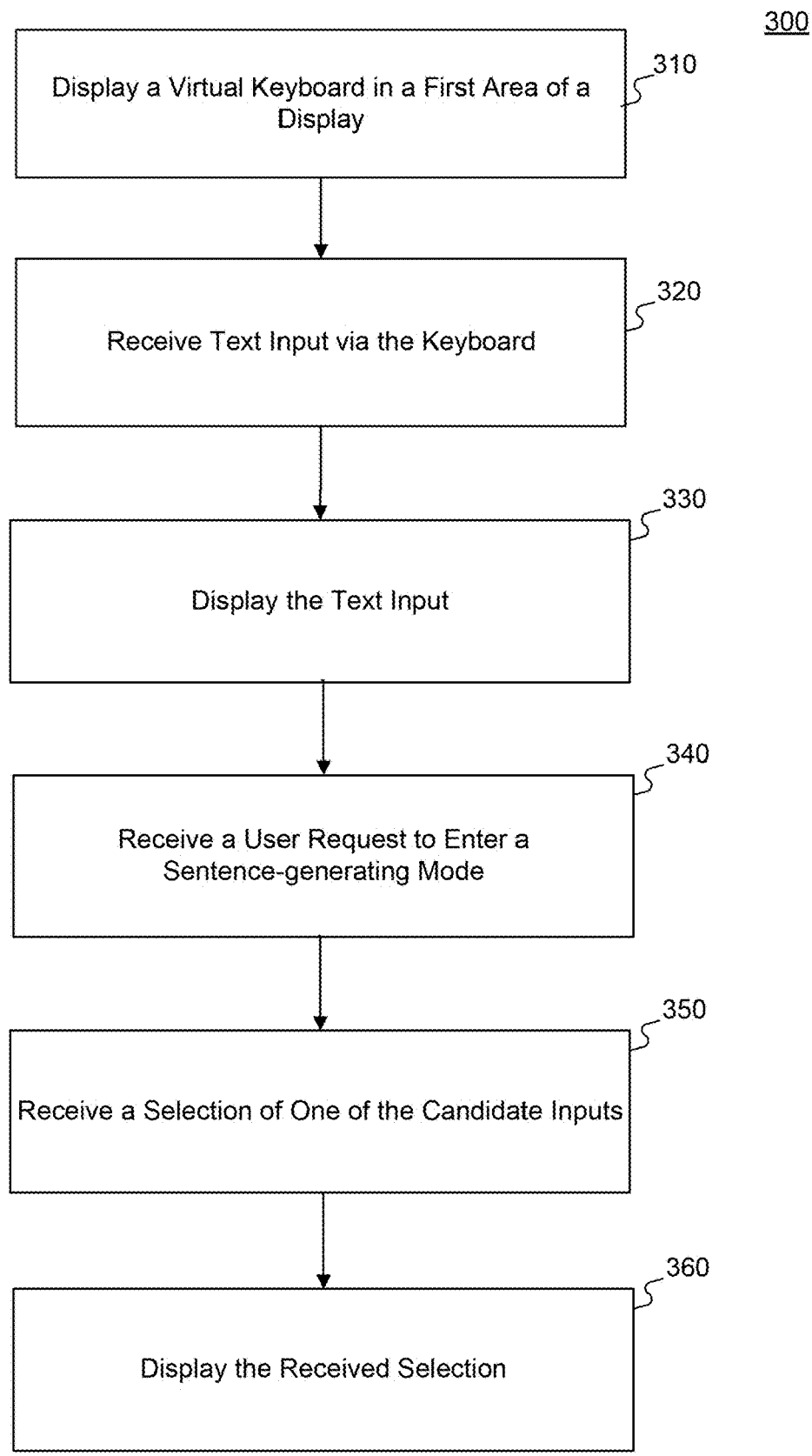
FIG. 3 is a flowchart of an exemplary process for providing candidate inputs on a user device, consistent with disclosed embodiments.

FIG. 3 is a flowchart of an exemplary process 300 for providing candidate inputs on a user device, consistent with disclosed embodiments. The steps associated with this example process may be performed by, for example, a processor of the user device 120 of FIG. 1. The exemplary process 300 allows the user device to provide candidate inputs for a user to select when the user types a message using the user device.

In step 310, the user device displays a virtual keyboard in a first area of the display. For example, the virtual keyboard may be displayed near the top of a touch screen, the bottom of a touch screen, or the space the user is currently entering text. The virtual keyboard includes a plurality of keys, each of which configured to register a respective character of a symbolic system on displayed user interface. In some embodiments, the virtual keyboard may be displayed in response to a user operation in a text field of a user interface. For example, the virtual keyboard may be displayed in response to a user tapping operation in a message input box of an instant messaging application. In some embodiments, the virtual keyboard may be displayed in response to a user selection of an icon on the user interface. For example, the virtual keyboard may be displayed in response to a user selecting an icon for composing a new Email in an Email application. The present disclosure does not intend to limit the types of virtual keyboards or the arrangement of keys in the virtual keyboards.

In step 320, the user device receives a text input via the virtual keyboard. The text input may include one or more letters, characters, words, numbers, symbols, punctuations, icons, and/or a combination of any of those.

In step 330, the user device displays the text input on the touchscreen.

Figure 4:
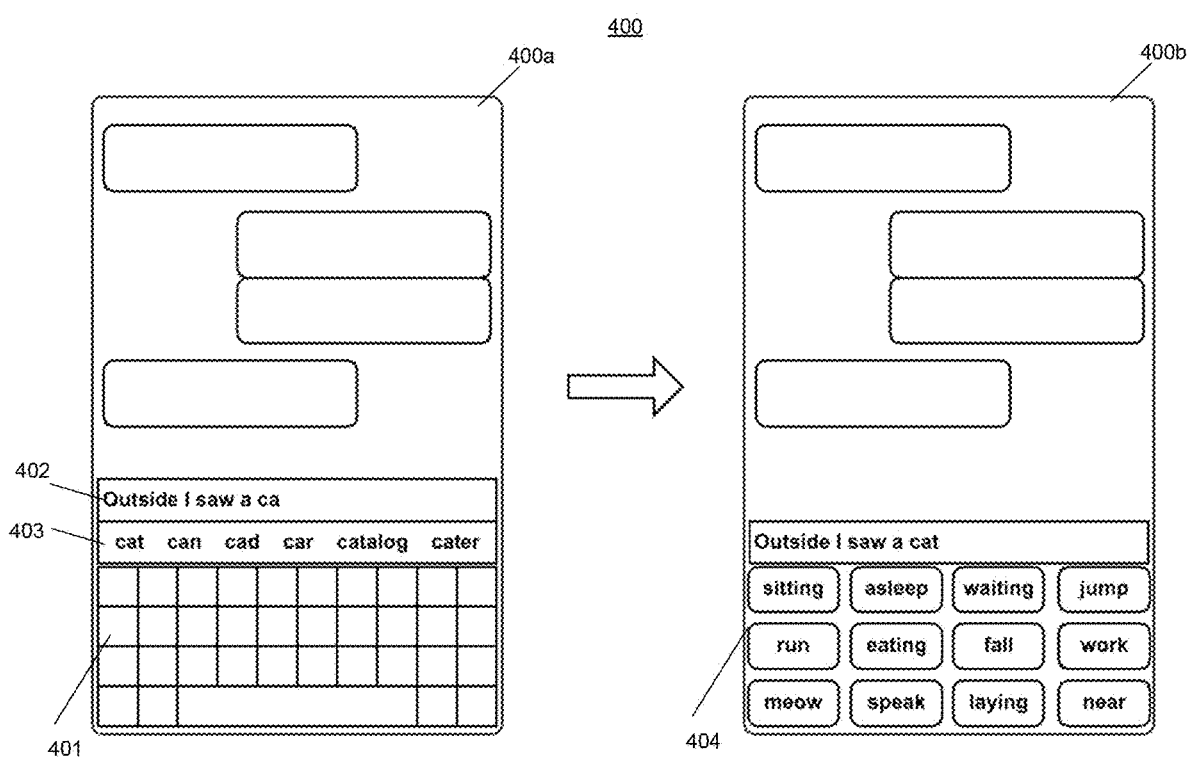
FIG. 4 illustrates an exemplary user interface for providing candidate inputs, consistent with disclosed embodiments.

Referring briefly to FIG. 4, there is illustrated an exemplary user interface 400 for providing candidate inputs, consistent with disclosed embodiments. As shown in the left diagram 400a, a virtual keyboard 401 is displayed in a first area that is near the bottom of the touchscreen display. The user device receives a text input 402 via the virtual keyboard, and text input 402 is displayed on the touchscreen. It can also be seen that the user device provides a text prediction function, and a plurality of candidate inputs 403 are displayed in the touchscreen. Candidate inputs 403 are provided based on the text input 402. For example, the user enters text "ca" via the virtual keyboard 401, and the user device provides candidate inputs that begin with letters "ca" for the user to select and enter, including "cat," "can," "cad," "car," "catalog," and "cater." Candidate inputs 403 are displayed in an area of the touchscreen that is near the text input, such as in a row below the text input field as shown in the diagram 400a. The virtual keyboard is displayed concurrently with the candidate inputs, such that the user may manually type the text instead of selecting one of the candidate inputs. This mode of displaying the candidate inputs concurrently with the virtual keyboard is referred to as the regular input mode in the present disclosure.

Returning now to FIG. 3, in step 340, the user device receives a user request to enter a sentence-generating mode. In the sentence-generating mode, the user device inhibits display of the keyboard and displays a plurality of candidate inputs in a second area of the display. In some embodiments, the second area for displaying the candidate inputs includes the first area where the virtual keyboard was displayed. For example, in the sentence-generating mode, the virtual keyboard was not displayed anymore, and the area where the virtual keyboard was displayed is used to display the candidate inputs.

Referring to FIG. 4, the right diagram 400b illustrates a user interface in the sentence-generating mode. As shown in the right diagram 400b, in the sentence-generating mode, the virtual keyboard is not displayed in the touchscreen. A plurality of candidate inputs 404 are displayed in a second area of the touchscreen, the second area including the first area where the virtual keyboard was previously displayed. As shown in the diagram 400b, the second area of the display includes a plurality of rows, the rows including a plurality of grids displaying the candidate inputs. It can be seen that by inhibiting the display of the virtual keyboard and using the first area to display the candidate inputs, the area to display the candidate inputs becomes larger and more candidate inputs can be displayed in the touchscreen compared to the regular input mode shown in diagram 400a.

In some embodiments, the user request to enter the sentence-generating mode may include a swiping gesture. For example, in the regular input mode of diagram 400a, a user may perform a swiping gesture on one of the displayed candidate inputs, such as the word "cat." The user device may detect the swiping gesture performed on the word "cat," and in response to the detection, switch to the sentence-generating mode for text input. The user request to enter the sentence-generating mode may include other gestures performed on the displayed candidate inputs, and the present disclosure does not intend to limit the types of gestures to trigger the sentence-generating mode.

In some embodiments, the user request to enter the sentence-generating mode may include a tracked eye movement. For example, in the regular input mode of diagram 400a, a user may blink one or both eyes when looking at one of the displayed candidate inputs, such as the word "cat." The user device may detect the blinking action and the user's gaze on the word "cat," and in response to the detection, switch to the sentence-generating mode for text input. The eye movement to enter the sentence-generating mode may include other eye movements, such as looking at the displayed candidate inputs one by one in sequence, and the present disclosure does not intend to limit the types of eye movements to trigger the sentence-generating mode.

In some embodiments, the user request to enter the sentence-generating mode may include selecting an icon displayed on the touchscreen. For example, a mode switching icon may be displayed on the touchscreen, and upon detecting a user selection of the mode switching icon, the user device may switch from the regular input mode to the sentence-generating mode.

In some embodiments, the sentence-generating mode may be set as a default mode for text input, and no user request to trigger the sentence-generating mode is required. The user device may switch from the sentence-generating mode to the regular input mode upon receiving a user request to do so. For example, a mode switching icon may be displayed on the touchscreen, and upon detecting a user selection of the mode switching icon, the user device may switch from the sentence-generating mode to the regular input mode.

Returning to FIG. 3, in step 350, the user device receives a selection of one of the candidate inputs. After the candidate inputs are displayed, a user may select one of the candidate inputs as a user input by performing a gesture. For example, a user may perform a swiping gesture on one of the candidate inputs, and upon detecting the swiping gesture on one of the candidate input, the user device may determine that corresponding candidate input is selected by the user.

Figure 5:
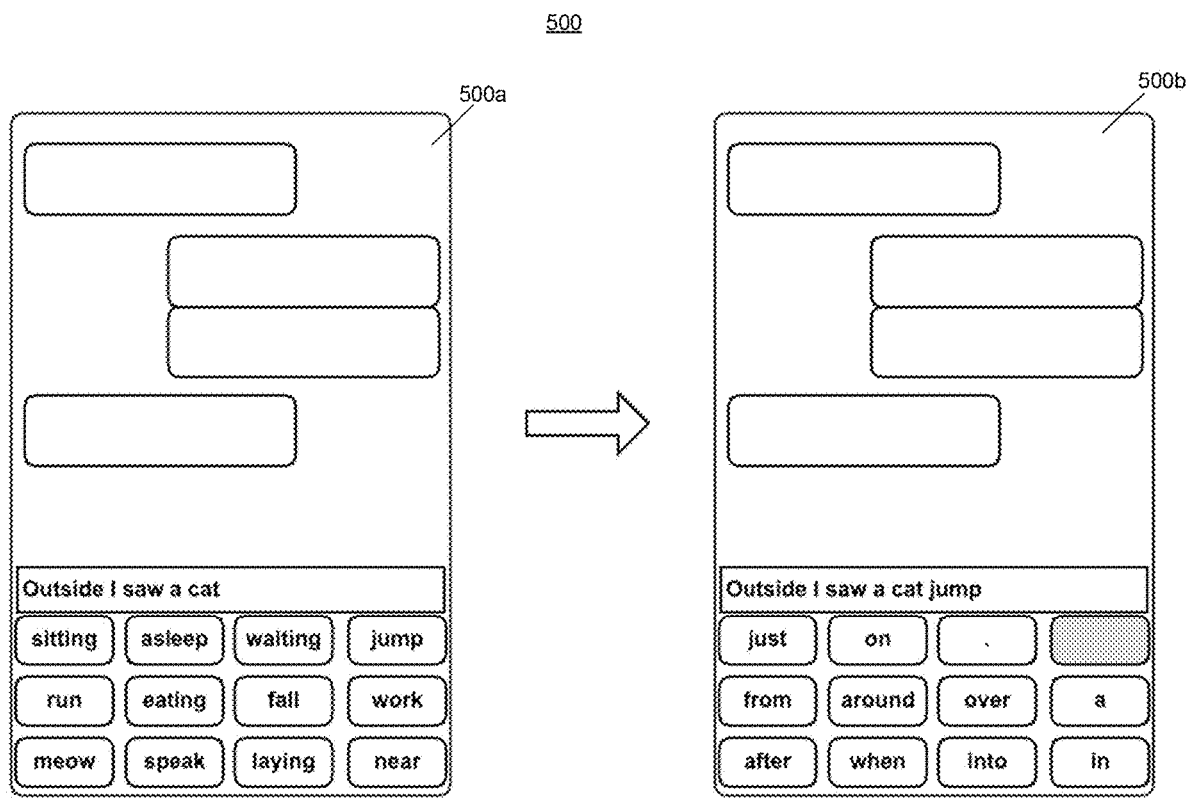
FIG. 5 illustrates another exemplary user interface for providing candidate inputs, consistent with disclosed embodiments.

FIG. 5 illustrates an exemplary user interface 500 for providing candidate inputs in a sentence-generating mode, consistent with disclosed embodiments. As shown in the left diagram 500a, a plurality of candidate inputs are displayed in the touchscreen. For example, the user device may detect a swiping gesture performed on the word "jump," and in response to the detection, determine that the word "jump" is selected by the user as the text input. As another example, the user device may detect a tapping gesture performed on the word "jump," and in response to the detection, determine that the word "jump" is selected by the user as the text input.

In some embodiments, the user device may determine the candidate inputs based on the user's historic activities. For example, the user device may obtain prior messages typed by the user in a predetermined time period, such as in the last month or in the last three months, and determine a word occurring after the same preceding word in the messages as a candidate input. Referring to diagram 500a shown in FIG. 5, the user device may identify that the word "eating" occurred after the word "cat" in the user's past messages and determine the word "eating" as a candidate input for displaying on the touchscreen. In some implementations, the user device may implement a statistics library to store the words inputted by the user following a certain word. The user device may update the statistics library each time as the user uses the user device to input messages to reflect the recent user activities for providing candidate inputs.

In some embodiments, the user device may determine the candidate inputs based on the user's historic communications with the same message recipient. For example, the user may be composing a message to send to a recipient, and the user device may obtain communication records between the user and the recipient in a predetermined time period for providing candidate inputs. If a word occurring after the same preceding word occurred in previous communication between the user and the recipient, the word may be determined as a candidate input. Referring to diagram 500*a* shown in FIG. 5, the user device may identify that the word "sitting" occurred after the word "cat" in a message sent from the recipient to the user, and determine the word "sitting" as a candidate input for displaying on the touchscreen. On the other hand, even though the word "crawling" occurred after the word "cat" in a message sent from the user to another recipient, the user device may determine the word "crawling" is not a candidate input for displaying on the touchscreen. In some implementations, the user device may implement a statistics library for each contact of the user to store the words inputted by the user or by the contact in communication between the user and the contact. The user device may update the statistics library for each contact each time as the user uses the user device to communicate with the corresponding contact in a text or messaging form, so as to reflect the recent communication between the user and the contact for providing candidate inputs.

In some embodiments, the user device may identify the application in the user device currently being used by the user for writing the message and take that into account in determining the candidate inputs. For example, if the user is using an Instant Messenger application to type the electronic message, such as a finance chatbot, the user device may determine that the message relates to finance and identify candidate inputs that relate to finance. As another example, if the user is using a vehicle shopping chatbot to input the electronic message, the user device may determine that the message relates to vehicle shopping and identify candidate inputs that relate to vehicles and sales.

In some embodiments, the user device may arrange the candidate inputs in the touchscreen based on likelihoods of the candidate inputs being selected by a user. For example, the user device may detect presence of a finger at a first position on the touchscreen display, and arrange the candidate inputs having a higher likelihood of being selected by the user at a position nearer to the first position. Referring to diagram 500*a* shown in FIG. 5, the user device may determine the user's finger is at the right edge of the box for the word "jump" on the touchscreen and arrange the candidate inputs having a higher likelihood of being selected by the user at a position nearer to the right edge of the box for the word "jump."

In some embodiments, the user device may detect an eye movement of the user and determine that one of the candidate inputs is selected by the user. For example, the user device may detect a gaze by the user on the word "jump," and determine that the word "jump" is selected by the user as a text input. As another example, the user device may detect a blinking action by the user while the user gaze on the word "jump," and in response to the detection, determine that the word "jump" is selected by the user as a text input. The eye movement to select one of the candidate inputs may include other eye movements, such as closing the eyes for a certain duration after looking at one of the candidate inputs. The present disclosure does not intend to limit the types of eye movements to select one of the candidate inputs.

In step 360, the user device displays the received selection. Referring to the right diagram 500*b* shown in FIG. 5, the user device determines the word "jumping" is selected by the user among the plurality of candidate inputs and displays the word "jumping" in the text field the user is currently inputting.

Once the received selection is displayed in the touchscreen, the user device determines the next set of candidate inputs and updates the previously displayed candidate inputs with the new set. As shown in diagram 500*b* of FIG. 5, a new set of candidate inputs is displayed once a user selection of the candidate input "jump" is received and the received selection is displayed on the touchscreen. Diagram 500*b* also shows that the candidate inputs can include punctuations in addition to words. In the present disclosure, the candidate inputs are not limited to words and can include words, punctuations, symbols, numbers, characters, icons, or a combination of any of those. Diagram 500*b* also shows that one or more grids for displaying the candidate inputs in the area for displaying candidate inputs may be left blank when the number of available candidate inputs is less than the number of candidate inputs that can be displayed on the touchscreen. For example, the grid that is farthest away from the position of the user's finger on the display may be left blank if the number of available candidate inputs is less than the number of candidate inputs that can be displayed on the touchscreen. The process of identifying and providing the new set of candidate inputs is the same as the process described above in connection with step 350. Steps 350 and 360 may be repeated until the user finishes inputting a message or a request to exit from the sentence-generating mode is received.

Figure 6:
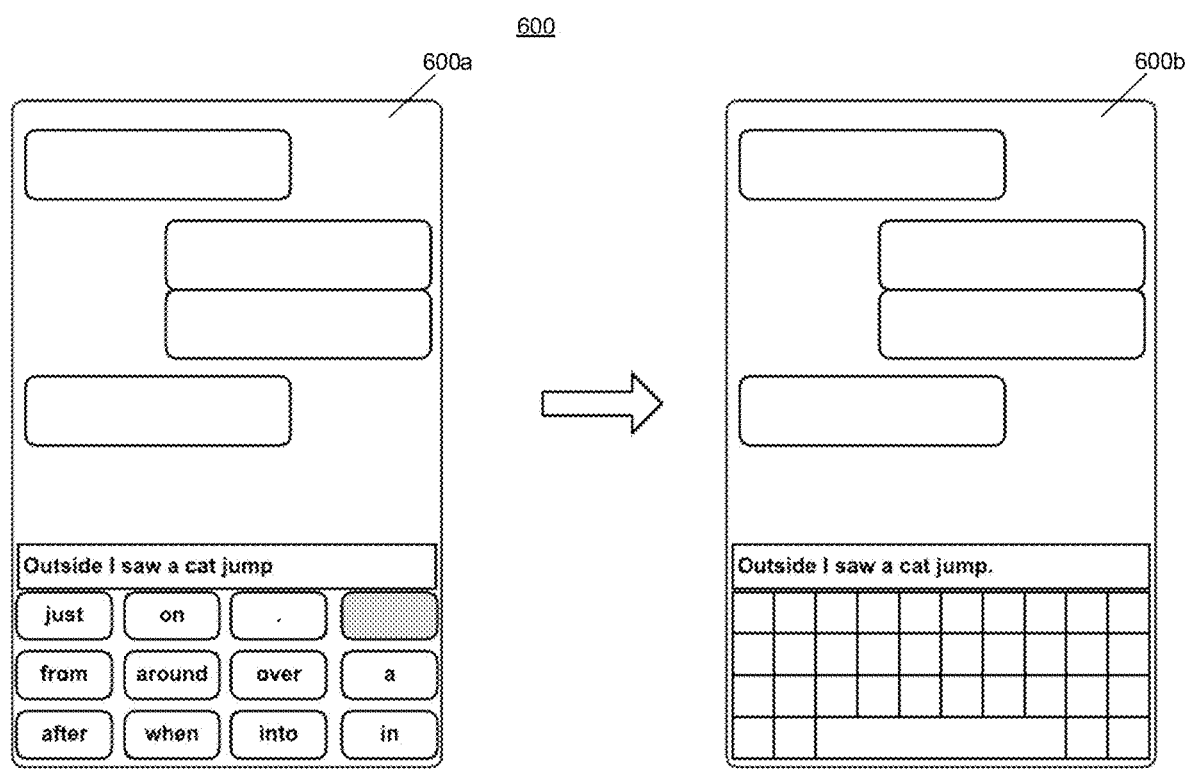
FIG. 6 illustrates another exemplary user interface for providing candidate inputs, consistent with disclosed embodiments.

FIG. 6 illustrates an exemplary user interface 600 for exiting from the sentence-generating mode, consistent with disclosed embodiments. As shown in the left diagram 600*a*, the user device is in the sentence-generating mode, and a plurality of candidate inputs are displayed in the touchscreen in lieu of the virtual keyboard. In some embodiments, the user device may detect a lift of a finger off the display, and in response to the detection, the user device may exit from the sentence-generating mode and return to the regular input mode. In some implementations, the user device may detect that the duration of the lift of the finger off the display is less than a predetermined time threshold, and maintains the sentence-generating mode for text input. On the other hand, if the user device detects that the duration of the lift of the finger off the display is equal to or greater than the predetermined time threshold, the user device may exit from the sentence-generating mode and return to the regular inputting mode. As shown in the right diagram 600*a*, the user device may detect that the user lifts the finger off the display, and in response, exit from the sentence-generating mode. The user device may return to the regular input mode in which the virtual keyboard is displayed on the touchscreen.

In some embodiments, the user device may exit from the sentence-generating mode upon detecting a user gesture performed on one or more of the candidate inputs. For example, the user device may detect a multi-finger tapping gesture on the candidate inputs, and in response to the detection, exit from the sentence-generating mode. As another example, the user device may detect a two-finger swiping gesture on one of the candidate inputs, and in response to the detection, exit from the sentence-generating mode. As another example, the user device may detect a multi-tapping gesture on one of the candidate inputs, and in response to the detection, exit from the sentence-generating mode. The user gesture to trigger exit from the sentence-generating mode may include other gestures performed on the displayed candidate inputs, and the present disclosure does not intend to limit the types of gestures to trigger exit from the sentence-generating mode.

In some embodiments, the user device may exit from the sentence-generating mode upon detecting a tracked eye movement. For example, the user device may detect a closing of the user's eyes for longer than a predetermined time duration, and in response to the detection, exit from the sentence-generating mode. The eye movement to exit from the sentence-generating mode may include other eye movements, and the present disclosure does not intend to limit the types of eye movements to trigger exit from the sentence-generating mode.

In some embodiments, the user device may exit from the sentence-generating mode upon detecting a selection of an icon displayed on the touchscreen. For example, a mode switching icon may be displayed on the touchscreen, and upon detecting a user selection of the mode switching icon, the user device may switch from the sentence-generating mode to the regular input mode.

In some embodiments, the user device may exit from the sentence-generating mode upon detecting a completion of the message input by the user. For example, after a user finishes inputting a message and sends it to a recipient, the user device may exit from the sentence-generating mode. As another example, the user device may detect a user finishing inputting a document, closing the document, and switching to another task of the user device. In response to the detection, the user device may exit from the sentence-generating mode.

In some embodiments, the user device may exit from the sentence-generating mode upon detecting no response from the user for a time duration longer than a predetermined threshold after the candidate inputs are displayed. For example, when the candidate inputs are displayed for a time duration longer than a predetermined threshold and no user selection on the candidate inputs is received, the user device may exit from the sentence-generating mode.

In some embodiments, the user device may allow a user to request display a different set of candidate inputs from those are currently displayed in the touchscreen. For example, upon detecting a user gesture, such as a tapping gesture, performed on one of the candidate inputs, the user device may provide synonyms, conjugations, or words similar to the one of the candidate inputs on the touchscreen.

Figure 7:
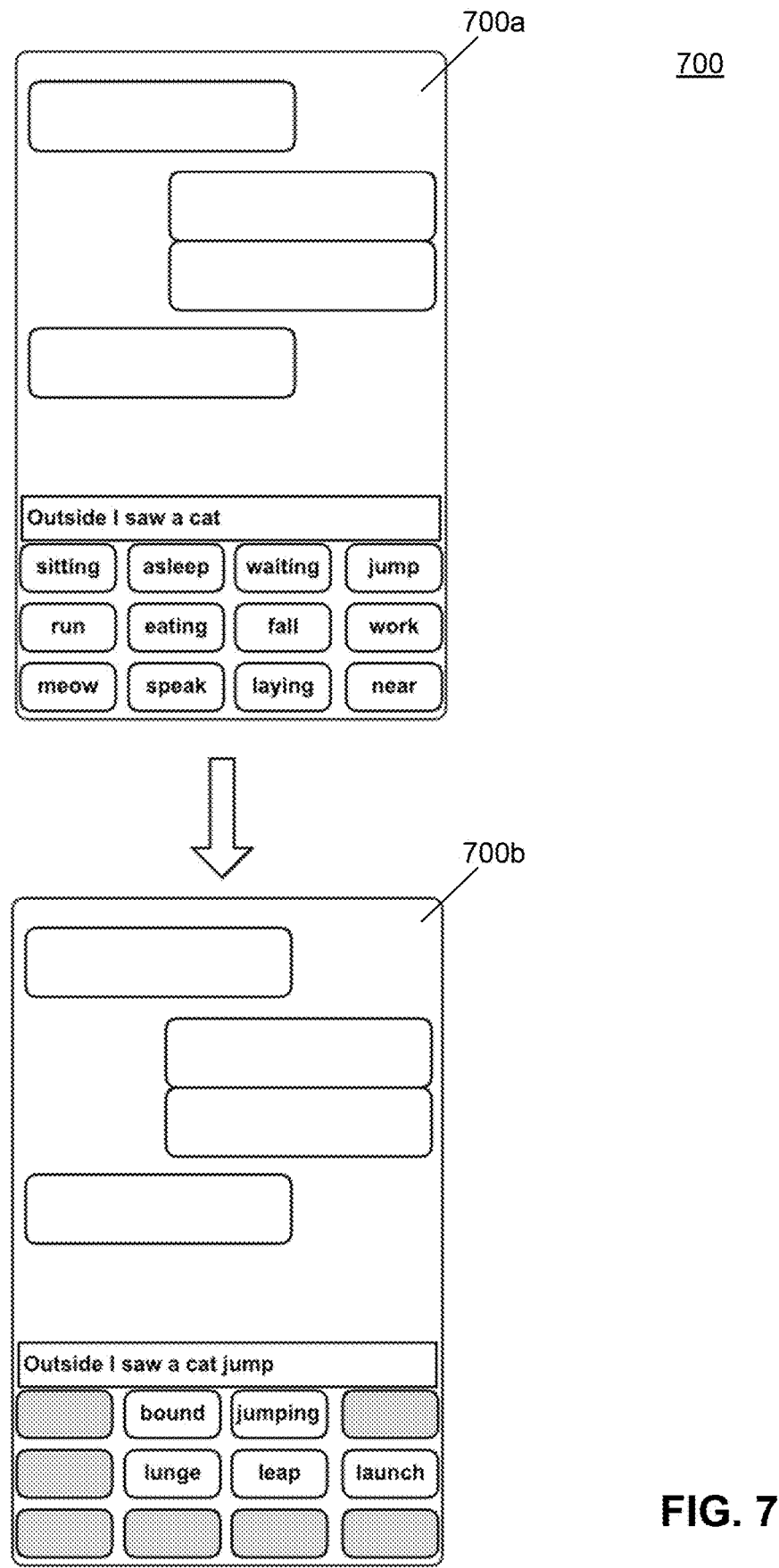
FIG. 7 illustrates another exemplary user interface for providing candidate inputs, consistent with disclosed embodiments.

FIG. 7 illustrates an exemplary user interface 700 for providing candidate inputs, consistent with disclosed embodiments. As shown in the top diagram 700a, the user device is in the sentence-generating mode, and a plurality of candidate inputs is displayed in the touchscreen. The user device then detects a user request to provide candidate inputs similar to the word "jump." For example, the user device may detect a tapping gesture performed on the word "jump" as a request to provide candidate inputs similar to the word "jump." As another example, the user device may detect a press-and-hold gesture performed on the word "jump" as a request to provide candidate inputs similar to the word "jump." As another example, the user device may detect a swipe-and-hold gesture performed on the word "jump" as a request to provide candidate inputs similar to the word "jump." The swipe-and-hold gesture starts with a swiping on the word "jump," and instead of lifting the finger at the end of the swiping, the user holds the finger on the touchscreen for a certain period of time. In response to the detected user request, the user device replaces the current candidate inputs with candidate inputs similar to the word "jump," such as words "leap," "launch," "bound," as shown in the lower diagram 700b. The user device may also replace the current candidate inputs with candidate inputs that are conjugations of the word "jump," such as words "jumping," "jumps," or "jumped." The present disclosure does not intend to limit the user gesture for changing the displayed candidate inputs, and other user gestures can be performed on the candidate inputs to indicate a request to display a different set of candidate inputs.

In some embodiments, the user request to change the displayed candidate inputs may include a tracked eye movement. For example, a user may blink one or both eyes when looking at one of the displayed candidate inputs, such as the word "jump" in diagram 700a. The user device may detect the blinking action and the user's gaze on the word "jump," and in response to the detection, replaces the current candidate inputs with candidate inputs similar to the word "jump." The eye movement to change the displayed candidate inputs may include other eye movements, and the present disclosure does not intend to limit the types of eye movements to change the displayed candidate inputs.

Figure 8:
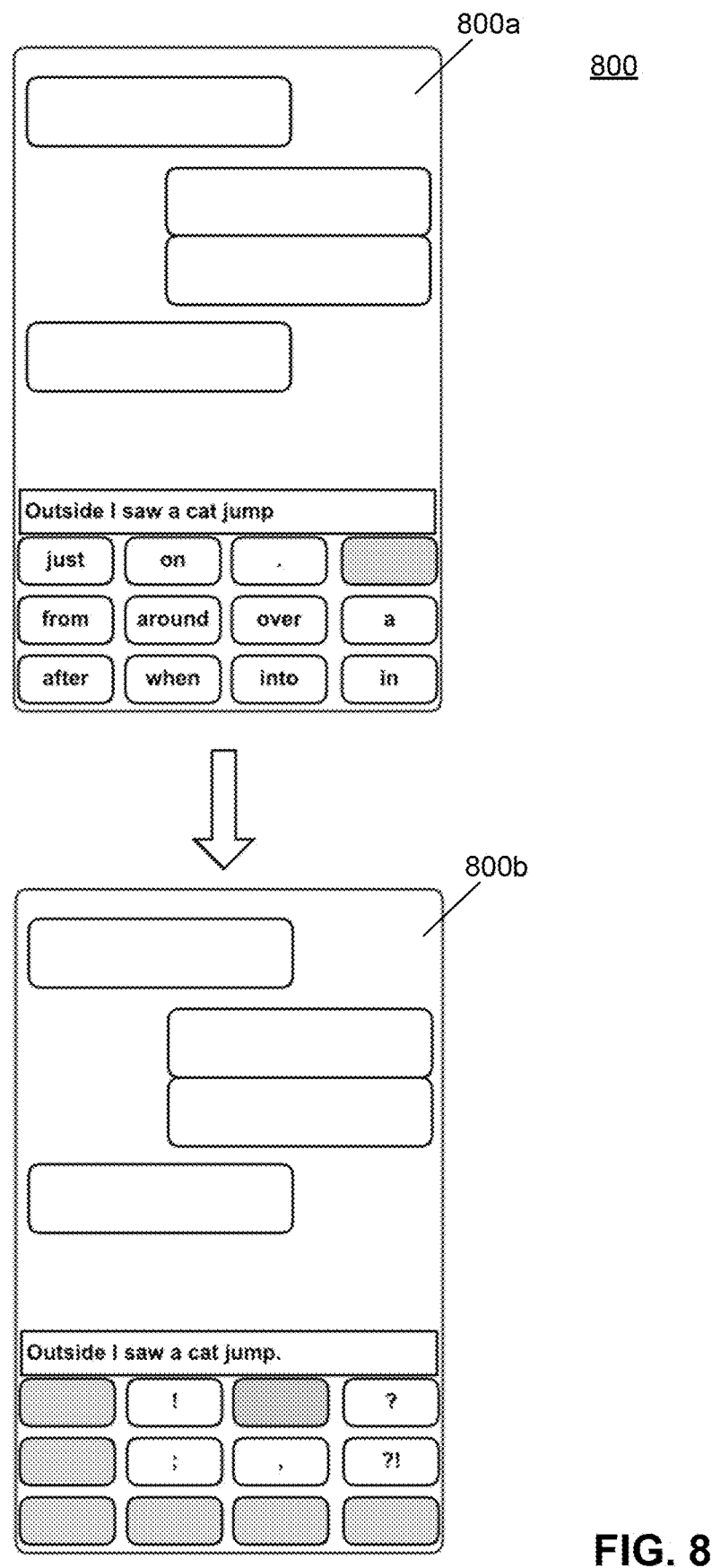
FIG. 8 illustrates another exemplary user interface for providing candidate inputs, consistent with disclosed embodiments.

FIG. 8 illustrates another exemplary user interface 800 for providing candidate inputs, consistent with disclosed embodiments. As shown in the top diagram 800a, the user device is in the sentence-generating mode, and a plurality of candidate inputs is displayed in the touchscreen. The user device then detects a user request to provide candidate inputs similar to the period punctuation "." For example, the user device may detect a tapping gesture performed on the punctuation "." as a request to provide more candidate inputs that are punctuations. As another example, the user device may detect a press-and-hold gesture performed on the punctuation "." as a request to provide candidate inputs that are punctuations. In response to the detected user request, the user device replaces the current candidate inputs with punctuations such as those shown in the lower diagram 800b.

In some embodiments, the user device may determine the alternate candidate inputs relating to the selected candidate inputs based on the user's historic activities. For example, the user device may obtain the prior messages the user typed in a predetermined time period, such as in the last month or in the last three months, and determine one or more inputs relating to selected candidate input. Referring to diagram 800b shown in FIG. 8, the user device may identify that the punctuations frequency used by the user in the past include an exclamation point, a question mark, a semi-colon, a colon, and an exclamation point and question mark together. In some implementations, the user device may implement a statistics library to store the related words that are input by the user. The user device may update the statistics library each time as the user uses the user device to input messages to reflect the recent user activities for providing candidate inputs. For example, when an alternate candidate input is selected by a user, such as the exclamation point in diagram 800b, the user device may store the information, such that when another user request to display alternate punctuations is received, the user device may display the exclamation point at a position close to the position where the user's finger is at.

In some embodiments, the user device may determine the alternate candidate inputs based on the user's historic communications with the same message recipient. For example, the user device may obtain communication records between the user and the recipient in a predetermined time period for providing alternate candidate inputs. If a word relating to the selected candidate input occurred in previous communication between the user and the recipient, the word may be determined as an alternate candidate input. Referring to diagram 800*b* shown in FIG. 8, the user device may identify that the punctuation "?!" occurred in a message sent from the recipient to the user, and determine the punctuation "?!" as an alternate candidate input for displaying on the touchscreen. On the other hand, even though the ellipsis mark " . . . " occurred in a message sent from the user to another recipient, the user device may determine the ellipsis mark " . . . " is not an alternate candidate input for displaying on the touchscreen. In some implementations, the user device may implement a statistics library for each contact of the user to store the related words that are input by the user or by the contact in communication between the user and the contact. The user device may update the statistics library for each contact each time as the user uses the user device to communicate with the corresponding contact, such that when a user request for alternate candidate inputs is received, updated alternate candidate inputs may be provided.

In the preceding disclosure, various example embodiments have been described with reference to the accompanying drawings. It will, however, be evident that various modifications and changes may be made thereto, and additional embodiments may be implemented, without departing from the broader scope of the disclosure as set forth in the claims that follow. The disclosure and drawings are accordingly to be regarded in an illustrative rather than restrictive sense.

Therefore, it is intended that the disclosed embodiments and examples be considered as examples only, with a true scope of the present disclosure being indicated by the following claims and their equivalents.

What is claimed is:

1. A user device, comprising:
   a display;
   at least one processor; and
   at least one memory storing instructions that, when executed by the at least one processor, cause the at least one processor to perform operations comprising:
      displaying a virtual keyboard across a first area of the display;
      receiving a text input via the keyboard;
      displaying the text input;
      displaying, at a first location of the display, a suggested candidate input based on the text input;
      receiving a user request, based on a first gesture performed by a user on the suggested candidate input, to enter a sentence generating mode, the sentence generating mode:
         inhibiting displaying of the keyboard, and
         displaying, across a second area of the display, first candidate inputs based on (i) the text input and (ii) a type of application receiving the text input, wherein:
            the first candidate inputs having a higher likelihood of being selected are positioned nearer to the first location, and
            the second area comprises the entirety of the first area;
      receiving a selection, made by a user tapping gesture, on one of the first candidate inputs at a second location of the display;
      displaying the received selection; and
      displaying second candidate inputs based on the selection, wherein the second candidate inputs having a higher likelihood of being selected are positioned nearer to the second location.

2. The user device of claim 1, wherein receiving a selection comprises:
   detecting a second gesture performed by the user on one of the second candidate inputs; and
   in response to the detecting, determining that the one of the second candidate inputs is selected.

3. The user device of claim 2, wherein
   at least one of the second candidate inputs is a synonym or a conjugation of the one of the first candidate inputs.

4. The user device of claim 3, wherein the second gesture comprises at least one of a tapping gesture or a press and hold gesture.

5. The user device of claim 1, wherein the first gesture comprises a swiping gesture.

6. The user device of claim 1, wherein the operations further comprise:
   detecting a lift of a finger off the display; and
   in response to detecting the finger lift, exiting from the sentence generating mode.

7. The user device of claim 1, wherein the second area of the display comprises a plurality of rows, the rows comprising a plurality of grids displaying the first candidate inputs.

8. The user device of claim 1, wherein
   displaying the first candidate inputs comprises displaying a candidate input having a highest likelihood of being selected by the user at a position nearer to the first location than ones of the candidate inputs having likelihoods other than the highest likelihood.

9. A method for providing a plurality of candidate inputs on a user device, comprising:
   displaying a virtual keyboard across a first area of a display;
   receiving a text input via the keyboard;
   displaying the text input;
   displaying, at a first location of the display, a suggested candidate input based on the text input;
   receiving a user request, based on a first gesture performed by a user on the suggested candidate input, to enter a sentence generating mode, the sentence generating mode:
      inhibiting displaying of the keyboard, and
      displaying, across a second area of the display, first candidate inputs based on (i) the text input and (ii) a type of application receiving the text input, wherein:
         the first candidate inputs having a higher likelihood of being selected are positioned nearer to the first location, and
         the second area comprises the entirety of the first area;
   receiving a selection, made by a user tapping gesture, on one of the first candidate inputs at a second location of the display;
   displaying the received selection; and
   displaying second candidate inputs based on the selection, wherein the second candidate inputs having a higher likelihood of being selected are positioned nearer to the second location.

10. The method of claim 9, wherein receiving a selection comprises:
   detecting a second gesture performed by a user on one of the second candidate inputs; and in response to the detecting, determining that the one of the second candidate inputs is selected.

11. The method of claim 10, wherein at least one of the second candidate inputs is a synonym or a conjugation of the one of the first candidate inputs.

12. The method of claim 11, wherein the second gesture comprises at least one of a tapping gesture or a press and hold gesture.

13. The method of claim 9, wherein the first gesture comprises a swiping gesture.

14. The method of claim 9, further comprising:
detecting a lift of a finger off the display; and
in response to detecting the finger lift, exiting from the sentence generating mode.

15. The method of claim 9, wherein the second area of the display comprises a plurality of rows, the rows comprising a plurality of grids displaying the plurality of candidate inputs.

16. A non-transitory computer-readable medium that stores a set of instructions that is executable by at least one processor of a user device to cause the user device to perform a method for providing a plurality of candidate inputs, the method comprising:
displaying a virtual keyboard across a first area of a display;
receiving a text input via the keyboard;
displaying the text input;
displaying, at a first location of the display, a suggested candidate input based on the text input;
receiving a user request, based on a gesture performed by a user on the suggested candidate input, to enter a sentence generating mode, the sentence generating mode:
inhibiting displaying of the keyboard, and
displaying, across a second area of the display, first candidate inputs based on (i) the text input and (ii) a type of application receiving the text input, wherein:
the first candidate inputs having a higher likelihood of being selected are positioned nearer to the first location, and
the second area comprises the entirety of the first area;
receiving a selection, made by a user tapping gesture, on one of the first candidate inputs at a second location of the display;
displaying the received selection; and
displaying second candidate inputs based on the selection, wherein the second candidate inputs having a higher likelihood of being selected are positioned nearer to the second location.

\* \* \* \* \*